Sept. 26, 1939.    R. R. WEDDELL ET AL    2,173,868
CUTTER AND BLADE THEREFOR
Filed Dec. 27, 1937    2 Sheets-Sheet 1
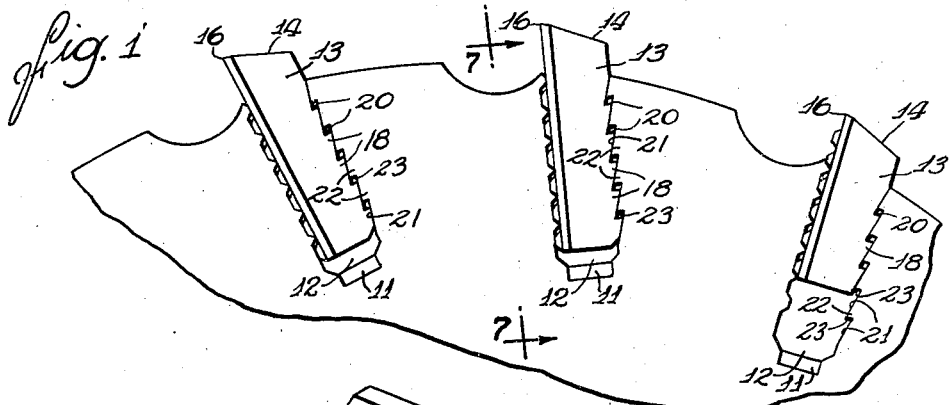
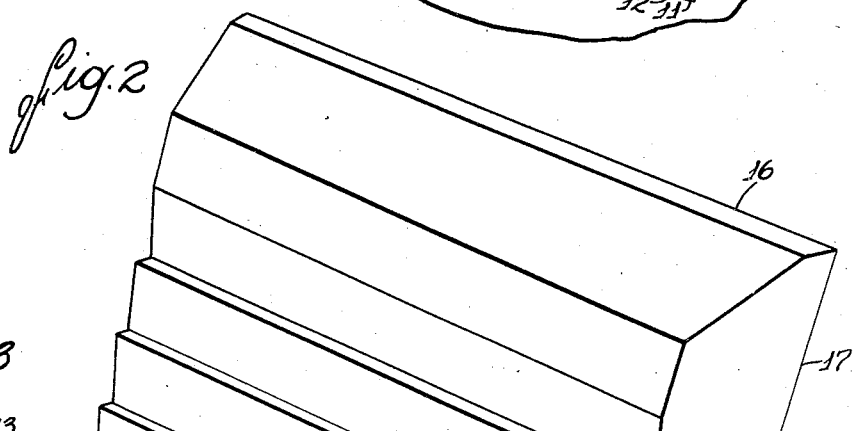
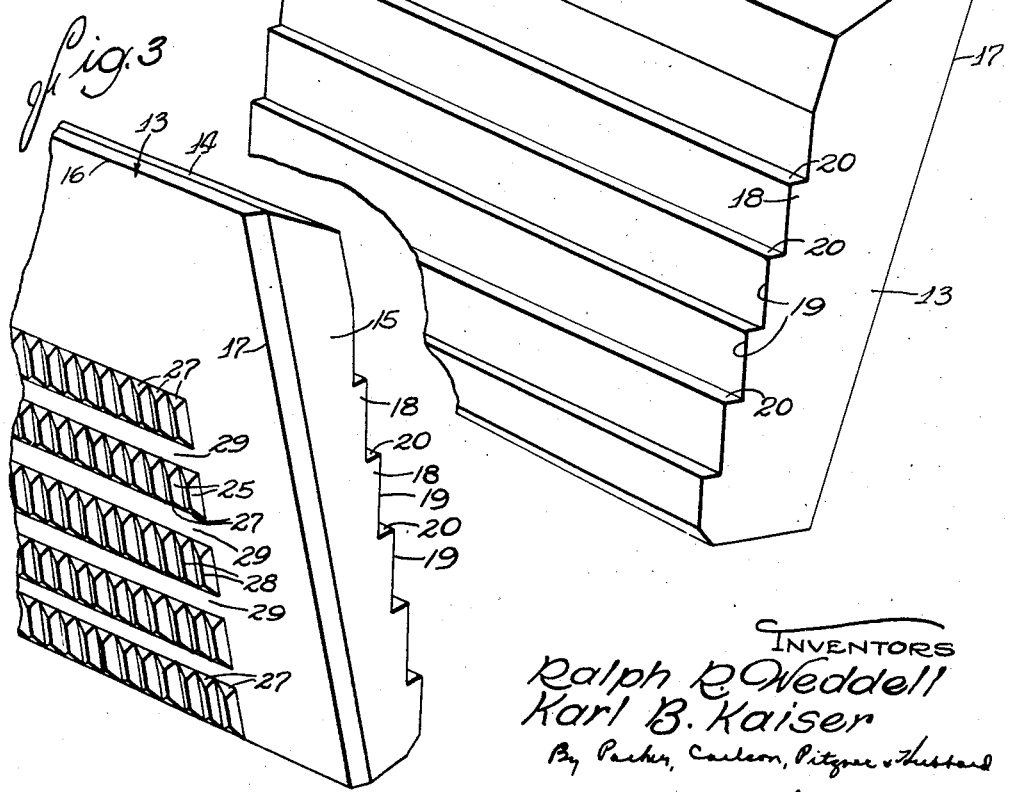
INVENTORS
Ralph R. Weddell
Karl B. Kaiser
By Parker, Carlson, Pitzner & Hubbard
ATTORNEYS Sept. 26, 1939.   R. R. WEDDELL ET AL   2,173,868
CUTTER AND BLADE THEREFOR
Filed Dec. 27, 1937   2 Sheets-Sheet 2
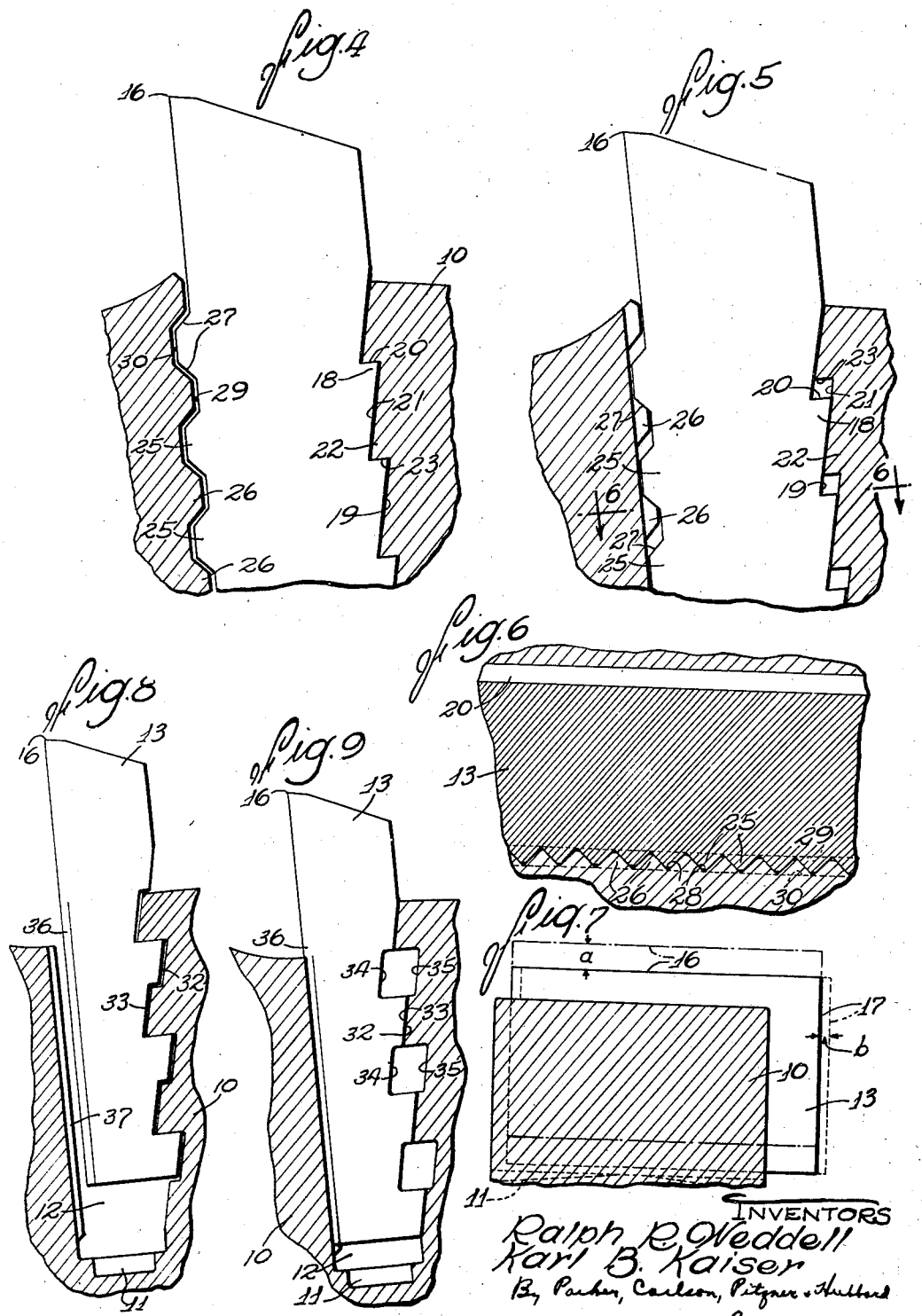

Patented Sept. 26, 1939

2,173,868

UNITED STATES PATENT OFFICE 2,173,868

CUTTER AND BLADE THEREFOR

Ralph R. Weddell and Karl B. Kaiser, Rockford, Ill., assignors to The Ingersoll Milling Machine Company, Rockford, Ill., a corporation of Illinois Application December 27, 1937, Serial No. 181,824

15 Claims. (Cl. 29—105)

This invention relates to inserted blade cutters, the blades of which may be adjusted for wear in one or more directions.

The general object is to provide in a cutter of the above character a new and improved blade mounting which permits the use of single piece blades of inexpensive construction, which provides an extremely positive and rugged lock for holding the blade against dislocation, which obviates the necessity of employing wedges, screws, pins or other auxiliary locking devices, and which is easy to adjust for wear.

The invention also resides in the novel construction of the cutter blades.

Other objects and advantages of the invention will become apparent from the following detailed description taken in connection with the accompanying drawings, in which Figure 1 is a fragmentary end view of a milling cutter embodying the novel features of the present invention.

Figs. 2 and 3 are fragmentary perspective views of the cutter blades looking from opposite sides thereof.

Figs. 4 and 5 are enlarged fragmentary end views illustrating the released and locked positions of a cutter blade.

Fig. 6 is a fragmentary sectional view taken along the line 6—6 of Fig. 5.

Fig. 7 is a section taken along the line 7—7 of Fig. 1.

Figs. 8 and 9 are views similar to Figs. 4 and 5 illustrating a modified form of the invention.

While the invention is susceptible of various modifications and alternative constructions, we have shown in the drawings and will herein describe in detail the preferred embodiments. It is to be understood that we do not thereby intend to limit the invention by such disclosure, but aim to cover all modifications and alternative constructions falling within the spirit and scope of the invention as expressed in the appended claims.

In the form selected for purposes of illustration, the invention is embodied in a rotary face milling cutter comprising a cylindrical body 10 formed around its periphery with annularly spaced slots or recesses 12 for receiving blades 13. The recesses extend at the usual shear angle to the cutter axis and are defined by opposed parallel side walls and a bottom wall 11, the recesses in this instance opening outwardly in directions both raidally and axially of the body.

The blades 13 each comprise a flat block of metal of substantially uniform thickness except for locking configurations provided on opposite sides thereof. One edge 14 and one end 15 slope to intersecting cutting edges 16 and 17. The shape and relative positions of the edges are of course determined by the character of the work to be performed.

To enable the blade to be wedged into and firmly locked in its slot and at the same time provide for outward step-by-step adjustment for wear especially on the primary edge 16, a plurality of spaced projections 18 are formed on the trailing side surface of the block, and usually, though not necessarily, extend in a direction generally longitudinally of one cutting edge to be adjusted. While in some instances, the projections 18 may be disposed at an angle relative to the primary cutting edge, they are, in the present instance, substantially parallel to the edge 16.

Each projection 18 has a substantially flat wedge surface 19 facing away from the cutting edge 16 and inclined at an effective wedging angle, for example, seven degrees, to the plane of the blade. Thus, the surfaces 19 are disposed in spaced parallel planes which converge toward the plane of the cutting edges in a direction away from the edge 16. The adjacent steps terminate at abrupt transverse shoulders 20 which face outwardly.

The wedge surfaces 19 cooperate with complemental surfaces 21 formed on projections 22 integral with the cutter body and extending into the blade recess from the trailing wall thereof. These projections are of course spaced and shaped to correspond to the projections 18 and have shoulders 23 between them which face toward the bottom of the slot.

The blade thus constructed may be moved into its slot when the projections 18 thereon are in register with the complemental grooves defined by the adjacent surfaces 21 and 23 of the body projections 22, this position being shown in Fig. 4. Then, by forcing the blade inwardly in a radial direction and transversely of the projections 18, the surfaces 19 and 21 interengage as shown in Fig. 5 causing the blade to be wedged against the opposite wall of the blade slot. By employing stepped wedge surfaces which engage as the blade is forced inwardly, the blade may be adjusted outwardly for wear in increments determined by the pitch of the projections 18. To effect such adjustment, the blade is released and removed, set outwardly one step, reinserted in its slot and finally wedged in place.

To positively lock the wedge blade against endwise movement and also edgewise tilting in its slot and to provide for outward adjustment of the short cutting edge 17, the leading side face of the blade and the adjacent wall of the slot are formed with complemental configurations which are correlated in construction with the wedge projections 18. In the present instance, these configurations comprise parallel serrations 25 formed integral with the blade and projecting from the leading side thereof. Each serration extends in a direction transversely of the wedge projections 18 and is adapted to fit into a groove defined between complemental serrations 26 formed on and projecting from the leading side wall of the blade recess.

Preferably, the blade and body serrations are generally V-shaped in cross-section and are of short lengths, being arranged end-to-end in alined relation so that each row constitutes in effect one elongated serration. To afford a maximum area of effective engagement between the blade and body serrations and to the clearances required, each serration is formed at its ends with beveled surfaces 27 which converge toward each other. The length of the tips 28 is equal approximately to half the pitch of the wedge surfaces 18 and 21 and the pitch of the serrations in each longitudinal row is equal to that of the wedge projections 18. When thus spaced, the serrations on the blade are also divided into a plurality of rows extending transversely of the direction of the wedging action or longitudinally of the cutting edge 16, being separated by grooves 29 complemental in shape to the serrations 26 on the body. The latter serrations are similarly grouped and separated by grooves 30 for receiving the blade serrations.

Such shaping of the blade and body serrations and correlation of the spacing thereof with the wedge surfaces 19 and 21 permits the blade to be inserted endwise into its slot without necessitating the use of extremely fine serrations or a substantial reduction in the effective wedging area. Thus, when the blade is positioned radially in the slot as shown in Fig. 4, with the serrations 25 on the blade alined longitudinally with the transverse grooves 30 in the body, the blade may be shifted endwise into or out of the body, the shoulders 20 and 23 then being disposed close to each other. After being inserted, the blade may be forced inwardly in a radial direction and will become wedged into the locked position shown in Fig. 5 after a movement equal to a small part of the pitch of the stepped wedge surfaces 19. With the surfaces 19 and 21 thus engaging each other throughout the major portion of their widths, a large wedging area is effective in providing a rugged backing for the blade. In the wedging movement, the serrations on the blade and body become alined as shown in Fig. 5 and wedged firmly against each other throughout the width and length of their side surfaces. With the serrations thus interlocked, the blade is held positively against tilting of the wedge surfaces relative to each other. Moreover, the surfaces are arranged so that the forces acting on the blade in normal service use tend to increase the wedging action and the gripping engagement between the serrations.

By forming the serrated blade surface with the grooves 29 so as to facilitate insertion of the blade into its slot and by beveling the ends of the individual serrations, the reduction in the area of effective engagement between the wedge surfaces 19 and 21 incident to wedging the blade in the body is held at a minimum. Thus, the blade need only be slightly narrower than its recess in order to provide the clearance necessary for permitting endwise insertion of the blade. In addition, by employing serrations with beveled ends, the clearance necessary in order to permit the blade and body serrations to pass each other readily during insertion of the blade is reduced to a minimum.

The arrangement of the serrations also permits the cutter blades to be set out in an endwise direction and the edge 17 to be adjusted for wear in increments which are substantially smaller than the increments of radial adjustment which are made possible by the stepped construction of the wedge. To effect such radial and axial adjustment, the blade is removed from its recess after being loosened as by driving a wedge or drift in between the inner edge of the blade and the bottom of the blade recess which may be inclined slightly for this purpose. After being set out radially one wedge step, the blade is reinserted endwise until the cutting edge 17 reaches the desired axial position and the blade serrations are alined with the radial notches between the body serrations. Finally, the blade is pressed inwardly and wedged in place. Thus, the pitch of the wedge projections 18 and 22 governs the radial adjustment of the blades in increments $a$ (Fig. 7) while the increments $b$ of endwise adjustment are determined by the pitch of the serrations 25 and 26.

The improved blade mounting described above possesses numerous advantages not only from the standpoint of economy of manufacture but also because of the effectiveness of the locking action obtained. The blade is of substantially uniform thickness, and when locked in p'ace, engages the body over a large effective wedging area, the arrangement being such that the forces acting on the cutting edges tend to increase the wedging action. In addition, the large area of engagement and coarse construction of the serrations effectually sustains the axial forces exerted on the blade and firmly locks the same in the body against any tendency of the blade to tilt edgewise. The necessity of employing wedges, pins, or other auxiliary locking devices is avoided thereby providing for optimum ruggedness of the blade mounting. The mounting is especially adapted for use in cutters having blades of substantial length inasmuch as the blade is of uniform thickness and the use of wedge surfaces tapering throughout the length or depth of the blade recess is eliminated.

Instead of forming grooves in the serrated side of the blades to facilitate insertion in the body and to avoid the use of fine serrations, the wedge surface may, at some sacrifice of effective wedging area, be formed as shown in Fig. 8. In this modification, the wedge surfaces on the blade and body are indicated at 32 and 33 respectively. These are separated by grooves 34 and 35 which are of sufficient width and depth to receive the wedge surfaces and permit lateral offsetting of the blade as shown in Fig. 8. In this position of the parts, the serrations 36 and 37 are disengaged and will pass each other during insertion of the blade in its slot. Then, after the inserted blade has been shifted laterally to engage the serrations, it is forced inwardly wedging the surfaces 32 and 33 together as shown in Fig. 9, the blade becoming locked firmly in the body. The blade may be adjusted radially and axially in the manner previously described in connection with the preferred form of the invention.

In some rotary cutters, the main cutting edge 16 will extend transversely of the rotational axis of the cutter body instead of longitudinally thereof as in the exemplary cutter shown. For such cutters, the wedge surfaces would also be extended along the end face of the body so as to occupy the same relation with respect to the main cutter edge.

We claim as our invention:

1. A cutter comprising, in combination, a body having an outwardly opening blade recess therein, a blade disposed in said recess with one marginal edge portion projecting therefrom, a cutting edge formed on said edge portion, interfitting and complemental projections on one side of said blade and one wall of said recess providing stepped wedge surfaces extending longitudinally of said edge and arranged to wedge together as the blade is forced into said recess edgewise of said edge, said projections being adapted to interfit in a plurality of different lateral positions of said edge, and interfitting and complemental serrations integral with the opposite side of the blade and the wall of said recess and extending transversely of said edge to hold the wedged blade against edgewise tilting.

2. A cutter comprising, in combination, a body having a blade recess therein opening at one side and one end, a blade disposed in said recess with one marginal edge portion projecting therefrom, a cutting edge formed on said edge portion, interfitting and complemental projections on one side wall of said recess and said blade providing stepped wedge surfaces disposed in parallel planes converging at a wedging angle toward the opposite recess wall and away from said edge so as to wedge together as the block is forced edgewise of said edge into said recess, and interfitting and complemental serrations on the opposite side of the blade and the wall of said recess extending longitudinally of said projections and operable to hold the wedged blade against edgewise tilting, said serrations being constructed for disengagement upon release of the wedging action whereby to permit endwise withdrawal of the blade from said recess.

3. A cutter comprising, in combination, a body having a blade recess therein opening at one side and one end, a blade disposed in said recess with one marginal edge portion projecting therefrom, a cutting edge formed on said edge portion, complemental stepped wedge surfaces on one side of said blade and one wall of said recess disposed in parallel planes converging at a wedging angle away from said edge and toward the opposite side of the blade whereby to wedge together as the blade is forced into said recess edgewise of said edge, and complemental projections on the opposite side of the blade and the wall of said recess arranged in parallel rows extending both longitudinally and transversely of said surfaces and adapted to interengage and hold the blade against endwise movement or edgewise tilting when said surfaces are wedged together, said projections alining with the grooves between the rows of complemental projections when said surfaces are released whereby to permit the blade to be withdrawn from said recess endwise of said surfaces.

4. A cutter comprising, in combination, a body having a blade recess therein opening at one side and one end, a blade disposed in said recess with one marginal edge portion projecting therefrom, a cutting edge formed on said edge portion, complemental stepped wedge surfaces on one side of said blade and one wall of said recess adapted to interfit in a plurality of different lateral positions of said edge and disposed in parallel planes converging at a wedging angle toward the opposite side of the blade whereby to wedge together as the blade is forced into said recess edgewise of said edge, complemental configurations on the opposite side of the blade and the wall of said recess extending transversely of said surfaces and adapted to interengage and hold the blade against endwise movement or edgewise tilting when said surfaces are wedged together, and complemental grooves in one side of said blade and the adjacent wall of said recess spaced according to the pitch of said surfaces and permitting the blade to be withdrawn from said recess endwise of said surfaces when the wedging action on said surfaces is released.

5. A cutter comprising, in combination, a body having a blade recess therein opening at one side and one end, a blade disposed in said recess with a portion projecting therefrom, complemental stepped wedge surfaces on one side of said blade and one wall of said recess disposed in parallel planes adapted to wedge together as the blade is forced into said recess edgewise of said surfaces, and complemental V-shaped projections on the opposite side of the blade and the wall of said recess arranged in spaced end-to-end relation transversely of said surfaces and adapted to interengage and hold the blade against endwise movement or edgewise tilting when said surfaces are wedged together, the longitudinal spacing of said projections permitting of endwise withdrawal of the blade from said recess when said wedge surfaces are released.

6. A cutter comprising, in combination, a body having a blade recess therein opening at one side and one end, a blade disposed in said recess with one marginal portion projecting therefrom, complemental stepped wedge surfaces on one side of said blade and one wall of said recess adapted to interfit in a plurality of different lateral positions of said edge and to wedge together as the blade is forced into said recess, and complemental projections on the opposite side of the blade and the wall of said recess arranged in end-to-end relation and extending transversely of said surfaces, said projections interengaging to hold the blade against endwise movement or edgewise tilting when said surfaces are wedged together, the ends of said projections converging toward each other.

7. A cutter blade comprising a block of material having opposite parallel faces, an edge surface sloping toward a cutting edge disposed substantially in the plane of one of said faces, projections on the other of said faces extending longitudinally of said edge and providing stepped wedge surfaces disposed in parallel planes converging at a wedging angle toward said first face and away from said edge, and parallel serrations on said first face extending transversely of said first edge and divided into parallel rows spaced to correspond to the pitch of said projections.

8. A cutter blade comprising a block of material adapted to provide a cutting edge, stepped wedge surfaces on one side of said block disposed in parallel planes converging at a wedging angle toward the opposite side of said block and away from said edge, and serrations on said opposite side arranged in parallel rows extending both longitudinally and transversely of said surfaces.

9. A cutter blade comprising a block of material adapted to provide a cutting edge along one margin, parallel projections on one side of said block extending longitudinally of said edge and having stepped parallel surfaces disposed at a wedging angle to the plane of said block, and projections on the opposite side of said block arranged in a row extending transversely of said first projections.

10. A cutter blade comprising a block of material adapted to provide a cutting edge along one margin, a plurality of stepped wedge surfaces on one side of said block disposed in parallel planes and at a wedging angle to the plane of the block, and projections on said opposite side arranged in parallel rows extending both longitudinally and transversely of said surfaces.

11. A cutter blade comprising a block of material adapted to provide a cutting edge, stepped wedge surfaces on one side of said block each extending at a wedging angle to the opposite side of said block, and a series of V-shaped projections on the opposite side of said block extending transversely of said surfaces and spaced apart in end-to-end relation according to the pitch of said surfaces.

12. A cutter blade comprising a block of material adapted to provide a cutting edge, stepped wedge surfaces on one side of said block each extending at a wedging angle to the opposite side of said block, and a series of projections on the opposite side of said block extending transversely of said surfaces and arranged in spaced end-to-end relation, the opposite end faces of each of said projections converging toward each other in a direction away from said block.

13. A cutter blade comprising a block of material adapted to provide a cutting edge, stepped wedge surfaces on one side of said block disposed in parallel planes converging at a wedging angle toward the opposite side of said block and away from said edge, serrations on said opposite side extending transversely of said surfaces, and grooves in one side of the block extending parallel to said surfaces and spaced to correspond to the pitch thereof.

14. A cutter blade comprising a block of material providing a cutting edge along one margin and disposed substantially in the plane of one side face, means on the opposite side face of said block providing a plurality of stepped wedge surfaces disposed in parallel planes intersecting said first mentioned plane at points spaced more remote from said edge than said surfaces, and configurations on said first face extending transversely of said surfaces and spaced in shorter increments than said surfaces.

15. A cutter blade comprising a block of material providing a cutting edge along one margin, means on one side face of said block providing a plurality of stepped wedge surfaces disposed in parallel planes intersecting the opposite side of the block at points disposed on the side of said surfaces opposite said edge, and configurations on said first face extending transversely of said surfaces.

RALPH R. WEDDELL.
KARL B. KAISER.